(12) United States Patent
Brisbin et al.

(10) Patent No.: US 11,534,998 B2
(45) Date of Patent: Dec. 27, 2022

(54) BALING ASSEMBLY WITH A SUPPORT STRUCTURE

(71) Applicant: Sebright Products, Inc., Hopkins, MI (US)

(72) Inventors: William D. Brisbin, Hopkins, MI (US); Brent H. Sebright, Hopkins, MI (US); David J. Wolf, Johnson Creek, WI (US)

(73) Assignee: Sebright Products, Inc., Hopkins, MI (US)

( * ) Notice: Subject to any disclaimer, the term of this patent is extended or adjusted under 35 U.S.C. 154(b) by 55 days.

(21) Appl. No.: 17/175,715

(22) Filed: Feb. 15, 2021

(65) Prior Publication Data

US 2022/0258445 A1    Aug. 18, 2022

(51) Int. Cl.
  *B30B 9/30* (2006.01)
  *A01F 15/10* (2006.01)

(52) U.S. Cl.
  CPC .......... *B30B 9/3021* (2013.01); *A01F 15/101* (2013.01); *B30B 9/3032* (2013.01); *A01F 2015/105* (2013.01)

(58) Field of Classification Search
  CPC ..... B30B 9/3021; B30B 9/3032; B30B 9/301; B30B 9/3014; B30B 9/305; B30B 9/3092; B30B 1/40; A01F 15/101; A01F 2015/105
  See application file for complete search history.

(56) References Cited

U.S. PATENT DOCUMENTS

| | | | | |
|---|---|---|---|---|
| 166,512 | A * | 8/1875 | Dolph et al. | B26D 5/16 100/291 |
| 764,096 | A * | 7/1904 | William | B41F 15/22 100/291 |
| 2,644,351 | A * | 7/1953 | Golay | B30B 9/32 100/234 |
| 4,462,291 | A * | 7/1984 | Schulz | B26D 5/16 100/291 |
| 6,679,164 | B2 * | 1/2004 | Futamura | B30B 1/18 100/291 |
| 2020/0383272 | A1 * | 12/2020 | Youngblood | A01F 15/042 |

* cited by examiner

*Primary Examiner* — Jimmy T Nguyen
(74) *Attorney, Agent, or Firm* — McGarry Bair PC

(57) ABSTRACT

A baling assembly includes a housing defining an interior and having an access opening selectively covered by a closure, a baling chamber within the housing and having a first wall movable along a first axis for compression of material within the baling chamber, and a ram adjacent the baling chamber. The ram includes a driving mechanism operably coupled to a support structure.

20 Claims, 14 Drawing Sheets

BALING ASSEMBLY WITH A SUPPORT STRUCTURE

BACKGROUND

Balers have been traditionally used to efficiently pack, handle, and transport materials such as straw and hay. An increase in demand to efficiently pack, handle, and transport materials other than straw and hay brought balers into the industrial arena. Balers in the industrial arena commonly incorporate a compactor. Balers can be utilized to compress and bind cardboard, plastic, aluminum, recyclables, waste material, or the like.

BRIEF DESCRIPTION

In one aspect, the disclosure relates to a baling assembly. The baling assembly includes a housing defining an interior and having an access opening selectively covered by a closure, a baling chamber within the housing and having a first wall movable along a first axis for compression of material within the baling chamber; and a ram in a ram chamber adjacent the baling chamber. The ram includes a first wall movable along a first axis for compression of material within the baling chamber and a driving mechanism operably coupled to the first wall to urge movement along the first axis, the driving mechanism being movable along the first axis and along a second axis unaligned with the first axis. The baling assembly further includes an adjustable support structure located adjacent the closure and operably coupled to the ram for adjusting a position of the ram along the second axis.

In another aspect, the disclosure relates to a support structure for a baling assembly having a ram with a driving mechanism. The support structure includes a first panel configured to secure to a housing of the baling assembly, a second panel configured to operably couple to the driving mechanism, a wedge located between the first panel and the second panel, and at least one fastener threadably received by the wedge and defining a variable spacing distance between the first and second panels.

DETAILED DESCRIPTION

Figure 1:
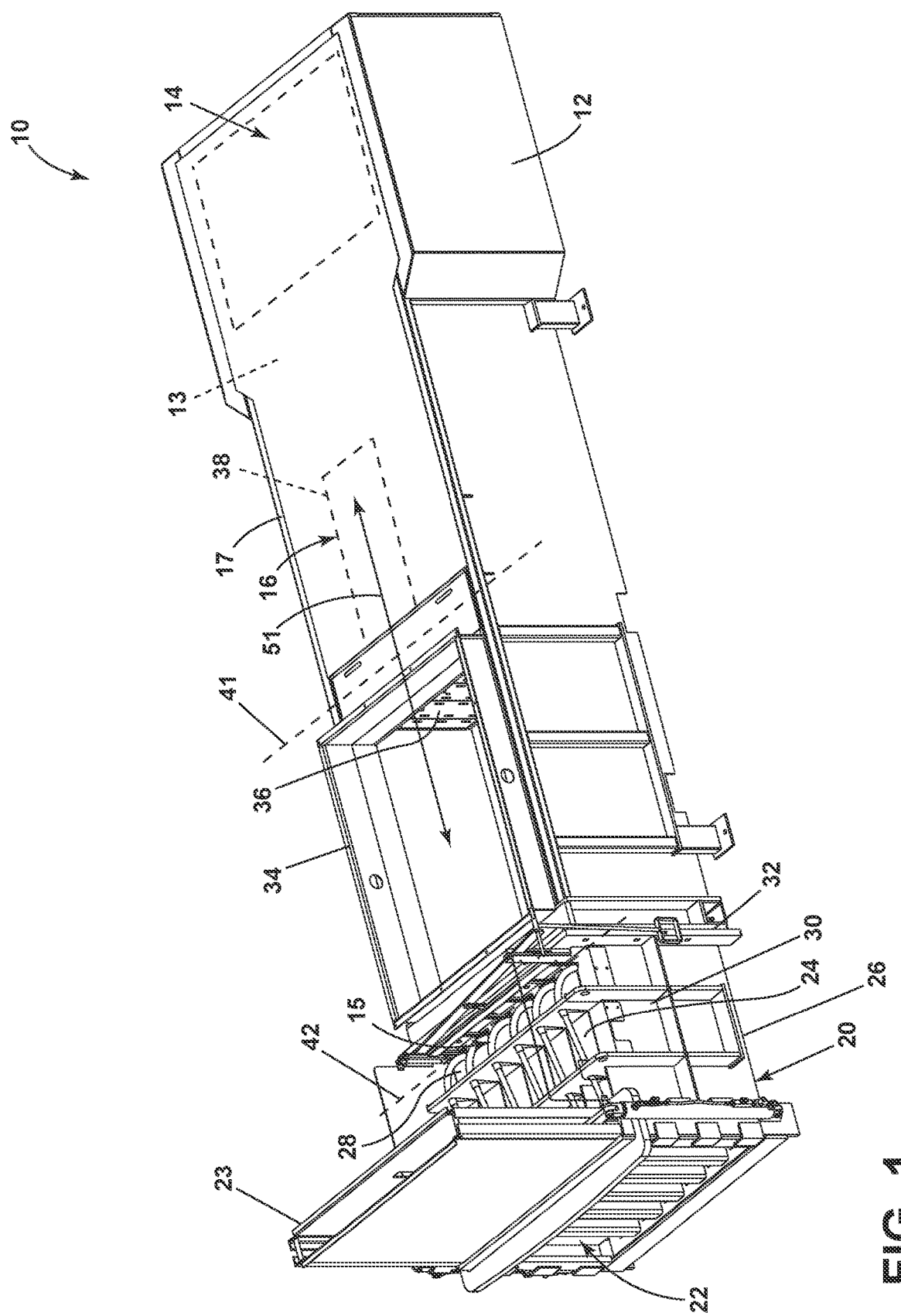
FIG. 1 is an isometric view of an exemplary baling assembly in accordance with various aspects described herein.

Aspects of the disclosure generally relate to balers or baling assemblies for compressing, containing, or securing a variety of materials. Balers typically include a hopper for loading the material to be compressed, wherein a compacting mechanism or ram can compress the material within a baling chamber. Rams typically include a movable wall coupled to a driving mechanism, such as a piston or the like, such that the driving mechanism causes the movable wall to contact and compress the material within the baling chamber.

During operation, the movable wall can slide along or over at least one surface of the baling chamber, such as a sidewall, top surface, or bottom surface. For example, the movable wall can include a ram knife or other portion configured to slide along an interior surface of the housing. If the movable wall or ram knife is spaced from the interior surface, material within the baling chamber may slip into the spacing gap during compression. Proper alignment of the ram, including alignment of the movable wall, ram knife, or the driving mechanism, is desirable for providing optimum compression of material within the baling chamber while also preventing wear of components within the baler.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, mounted, connected, fixed, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary. In addition, as used herein, "a set" will refer to any number of elements, including only one element.

FIG. 1 illustrates one exemplary baling assembly 10 including a housing 12 defining an interior 13 and having at least one closure 14. The housing 12 can include a set of baling guides 15, a ram 16 within a ram chamber 17, and a baling chamber 20. The baling chamber 20 includes a movable front wall 22, a top wall 24, a bottom wall 26, and opposing side walls 28, 30. A back plane 32 of the baling chamber 20 is also illustrated.

One or more closures 14, such as an access panel, door, hatch, or the like, can be provided in the housing 12 of the baling assembly 10. The closure 14 is illustrated on a top surface of the housing 12, though this need not be the case.

The closure 14 can be provided on a rear wall, side wall, or bottom wall of the housing in non-limiting examples.

In one example, the closure 14 can be removably mounted to the housing 12 and providing user access to the interior of the housing 12, such as for visual inspection, hands-on maintenance, insertion of tools, or the like, or combinations thereof. In the example shown, one closure 14 is illustrated along the housing 12 proximate the ram 16 though any number of closures 14 can be utilized. The closure 14 can be formed of any suitable material including, but not limited to, steel, aluminum, polycarbonate, acrylic, or the like, or combinations thereof, and can be opaque, transparent, or translucent. The closure 14 can be removably mounted to the housing 12 such as by a latch-and-catch mechanism, bolts or screws, or the like. Additionally or alternatively, the closure 14 can be hingedly connected to the housing 12.

The front wall 22 of the housing 12 is illustrated in the example of FIG. 1 as a gate-like structure, though this need not be the case. When the front wall 22 is in a "down" or "closed" position as illustrated, the front wall 22 defines a portion of the baling chamber 20. The front wall 22 can also be lifted into an "up" or "open" position (not shown) and is received within a front wall receiving chamber 23.

The ram 16 can be positioned within the housing 12. More specifically, the ram 16 can be located within the ram chamber 17 at least partially defined by the housing 12 and adjacent the baling chamber 20. In the example of FIG. 1, the housing 12 includes a hopper 34 within the ram chamber 17 and adjacent the baling chamber 20 for receiving material to be baled. It is also contemplated that material to be baled can be loaded into the hopper 34 via a conveyor system, or loaded directly into the baling chamber 20 without use of the hopper 34, or the like, or combinations thereof.

The ram 16 comprises a movable ram wall 36 coupled to a ram wall driving mechanism 38 within the housing 12. The ram wall driving mechanism 38 can be, in one non-limiting example, a hydraulic cylinder that can move the ram wall 36 along a first axis 51. More specifically, the ram wall driving mechanism 38 can urge movement of the ram wall 36 from a first position 41 to a second position 42 along the first axis 51 to direct material from the hopper 34 into the baling chamber 20 and compress such material within the baling chamber 20. In another non-limiting example, when moving the ram wall 36 from the first position 41 to the second position 42, the ram wall 36 can move past the second position 42 toward the front wall 22 of the baling chamber 20 before returning to the second position 42. The ram wall 36 can move several times back and forth to various positions along the first axis 51, including between the first position 41 and the front wall 22, before finishing a cycle in the second position 42. At the second position 42, the material to be baled is compressed within the baling chamber 20 between the ram wall 36 and the front wall 22. The first position 41 and second position 42 are shown by way of non-limiting examples in FIG. 1, and it will be understood that the first position 41 and second position 42 can be located at any suitable location relative to the first axis 51. Optionally, one or more sensors can be used to signal when the ram 16 is located in the first or second position 41, 42. Such sensors can include at least one of an optical sensor, a photoelectric sensor, an ultrasonic sensor, a pressure sensor, a global positioning system (GPS), a field sensor, or the like, or combinations thereof.

Figure 2:
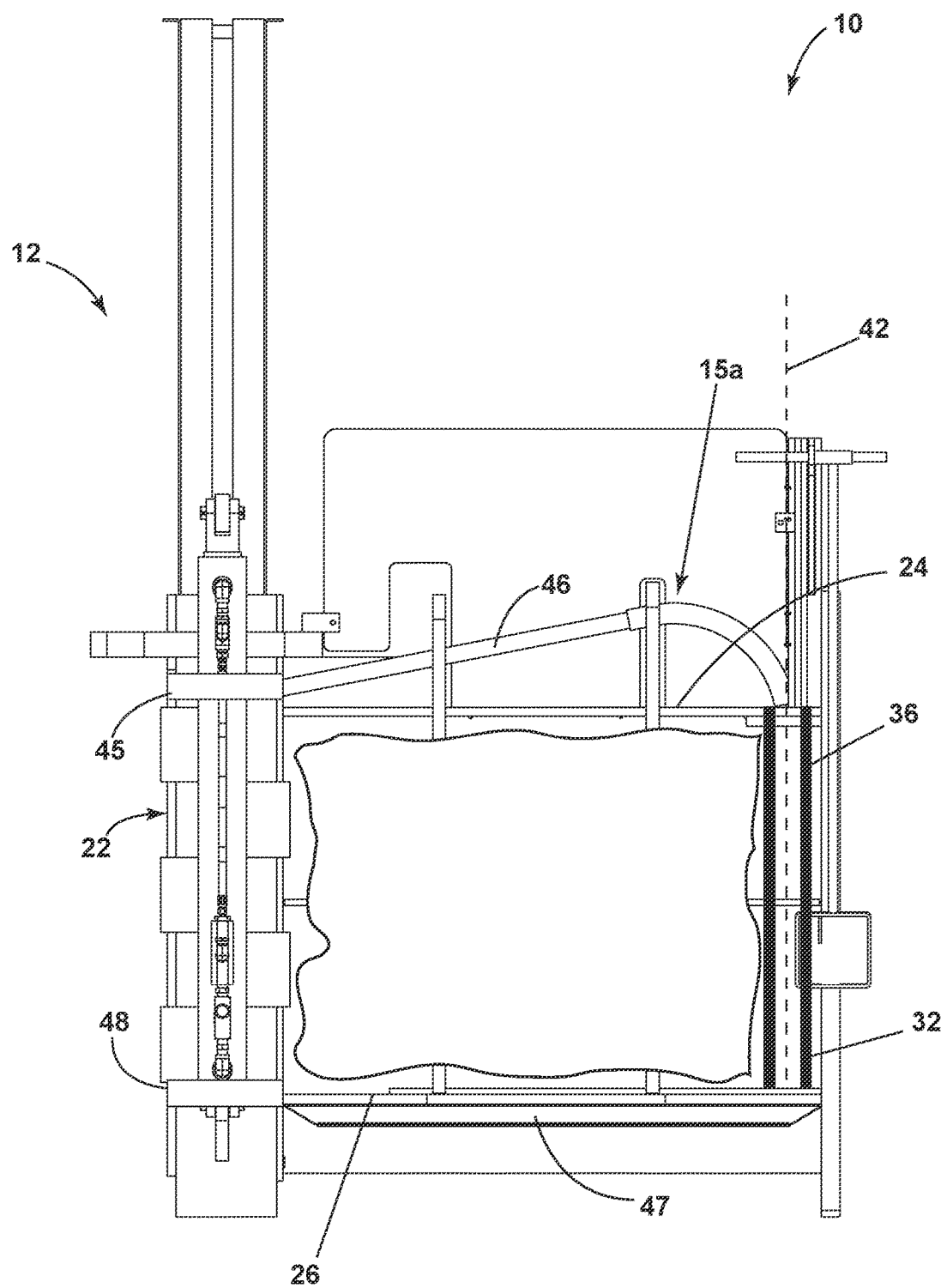
FIG. 2 is a schematic cross section of a portion of the baling assembly of FIG. 1.

FIG. 2 is a schematic cross section of the housing 12 of the baling assembly 10 when the ram wall 36 is in the second position 42, where material to be baled is compressed within the baling chamber 20. One baling guide 15a in the set of baling guides 15 is illustrated. The baling guide 15a includes an entrance 45, a first guide 46, a second guide 47, and an exit 48. It is contemplated that any combination of tubing, conduit, connecting portions, curved or straight portions, angled portions, spacing, grooves, or the like can be utilized in the set of baling guides 15.

With reference to FIGS. 1-2, during operation of the exemplary baling assembly 10, material can be inserted into the hopper 34. The ram wall 36 can move back and forth along the first axis 51, for example at least between the first position 41 and the second position 42, thereby compressing material within the baling chamber 20. After compression, opposing ends of the bale tie can be coupled to one another to secure the bale of compressed material.

Figure 3:
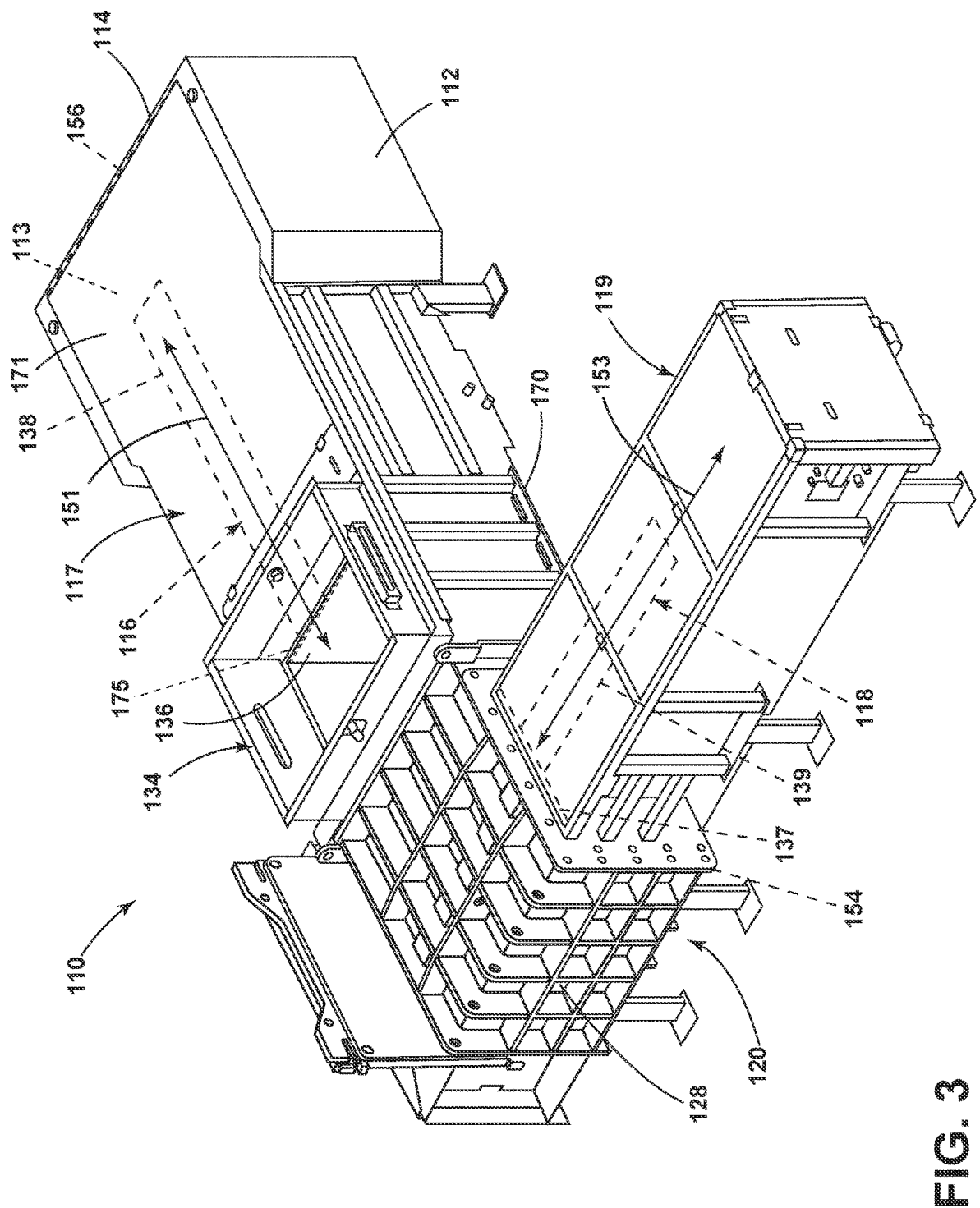
FIG. 3 is an isometric view of another baling assembly in accordance with various aspects described herein.

Referring now to FIG. 3, another baling assembly 110 is illustrated in accordance with various aspects described herein. The baling assembly 110 is similar to the baling assembly 10. Therefore, like parts will be described with like numerals increased by 100, with it being understood that the description of the like parts of the baling assembly 10 applies to the baling assembly 110, except where noted.

The baling assembly 110 includes a housing 112 defining an interior 113 and a baling chamber 120 located within the housing 112. One difference compared to the baling assembly 10 is that the baling assembly 110 includes multiple rams. In the example shown, the housing 112 of the baling assembly 110 at least partially defines a gathering ram chamber 117 extending along a first axis 151. A gathering ram 116 is provided within the gathering ram chamber 117. An ejection ram chamber 119, similar to the gathering ram chamber 117, is provided extending along an ejection axis 153 perpendicular to the first axis 151. An ejection ram 118 is provided within the ejection ram chamber 119. The ejection ram 118 can be similar to the gathering ram 116, though this need not be the case. The gathering ram chamber 117 and the ejection ram chamber 119 are each coupled to the baling chamber 120 such that material compressed within the baling chamber 120 by the gathering ram 116 can be ejected or otherwise removed from the baling chamber 120 by the ejection ram 118.

The gathering ram 116 includes a first wall or gathering ram wall 136 extending generally between a lower surface 170 and an upper surface 171 of the housing 112. The gathering ram wall 136 is movable along the first axis 151 as shown. The gathering ram 116 also includes a driving mechanism 138 coupled to the gathering ram wall 136. The gathering ram 116 also includes a ram knife 175 positioned adjacent an inner surface of the housing, and is illustrated adjacent the upper surface 171. The gathering ram chamber 117 further includes a hopper 134 positioned adjacent the gathering ram wall 136 and the baling chamber 120. The gathering ram wall 136 is configured to direct material from the hopper 134 into the baling chamber 120 and compress such material against a side wall 128 of the baling chamber 120, thereby forming a bale of compressed material. The ejection ram 118 includes an ejection ram wall 137 similar to the gathering ram wall 136 and movable along the ejection axis 153. The ejection ram 118 further includes a driving mechanism 139 coupled to the ejection ram wall 137. The ejection ram 118 can be configured to direct the compressed bale of material out of the baling chamber 120. In one example of operation, the gathering ram 116 can compress material within the baling chamber 120, the compressed bale can be ejected from the baling chamber 120 by the ejection ram 118, and bale ties or netting can be utilized to secure the bale of compressed material.

The housing 112 of the baling assembly 110 can also include at least one access opening. In the example shown, a first access opening 154 is provided at the rear of the baling chamber 120, and a second access opening 156 is provided at the gathering ram chamber 117. In addition, the at least one access opening can be selectively covered by a corresponding at least one closure. In the example shown, a closure 114 is provided at the rear of the gathering ram chamber 117 that can selectively cover the second access opening 156. The closure 114 can at least partially enclose the interior of the housing 112 and be formed of any suitable material. The closure 114 can provide for physical access or visual inspection for internal components within the baling assembly 110. It will be understood that access openings and closures can be provided in any portion of the housing 112 including the lower surface 170, upper surface 171, or a sidewall, in non-limiting examples.

In the example shown, the ejection ram chamber 119 covers over and closes the first access opening 154 when coupled to the baling chamber 120. Additionally or alternatively, an additional closure can be provided and selectively cover the first access opening 154, such as an interior wall or panel, slidable gate, or the like.

Figure 4:
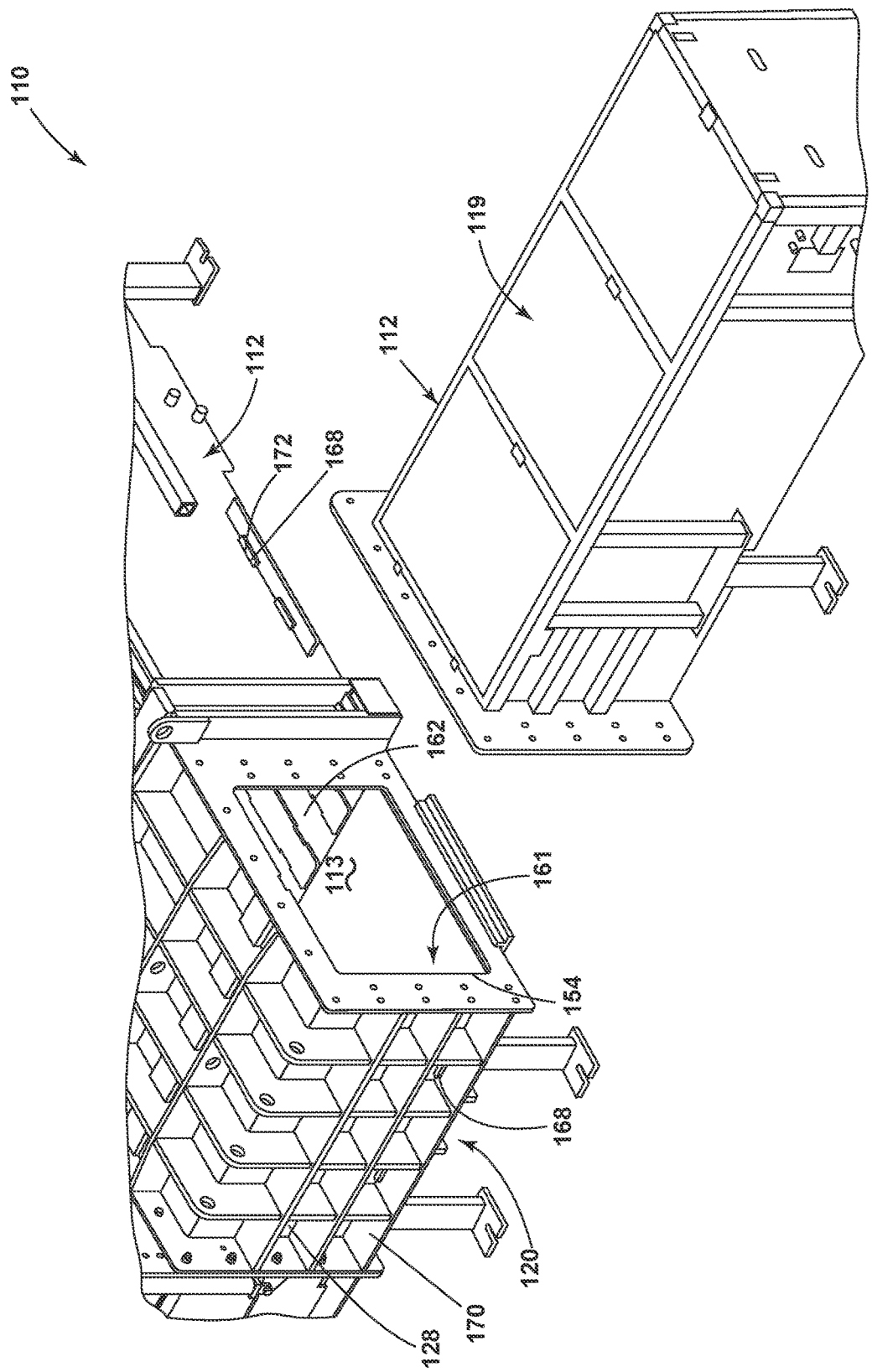
FIG. 4 is an isometric view of the baling assembly of FIG. 3 illustrating an interior portion of a baling chamber.

Turning to FIG. 4, the baling assembly 110 is illustrated with the ejection ram chamber 119 separated from the baling chamber 120, with the first access opening 154 visible in this view. At least one pad can be provided on or secured to the lower surface 170 of the housing 112. In the example shown, a first pad 161 is provided on the lower surface 170 within the baling chamber 120.

Figure 5:
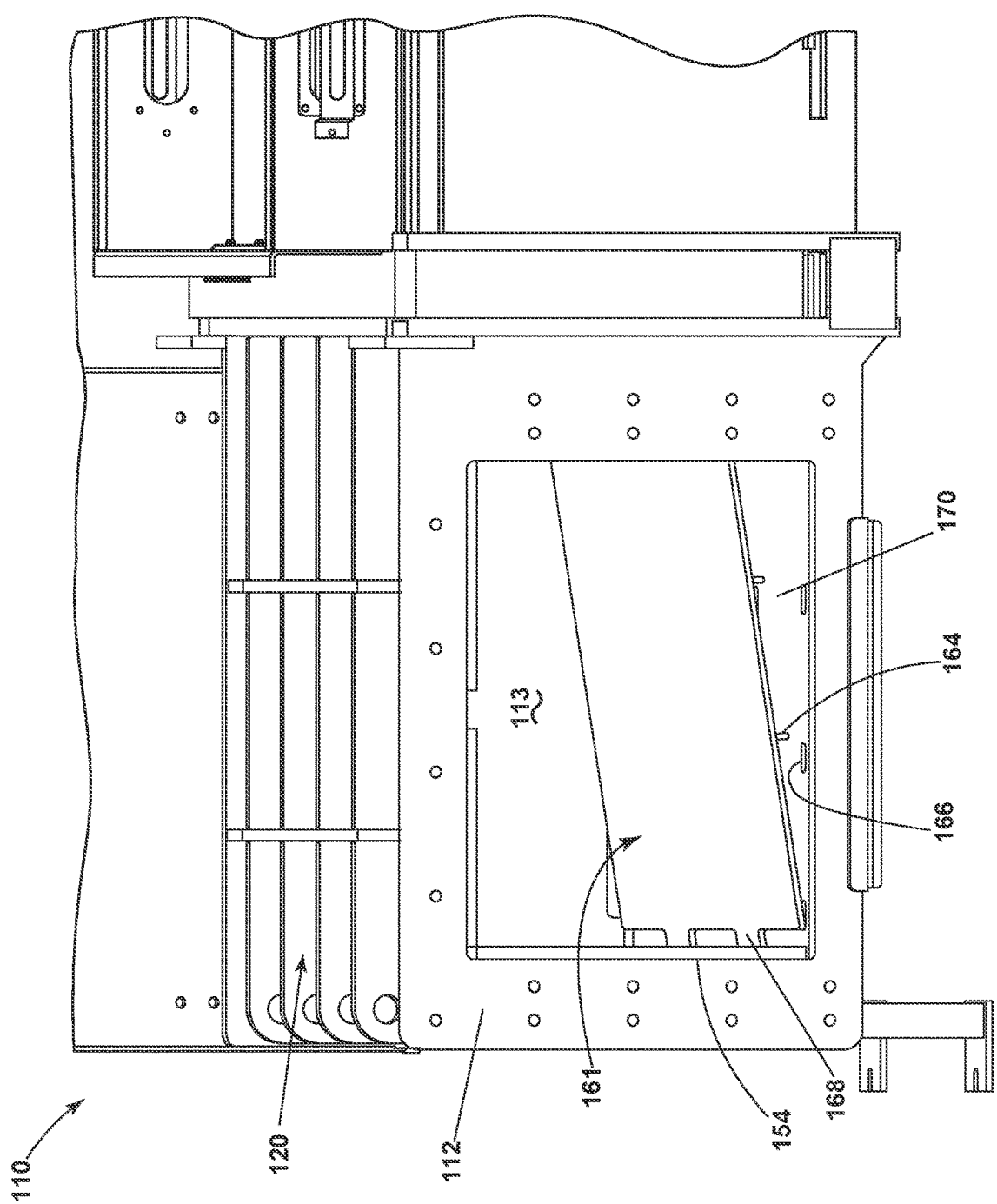
FIG. 5 is a right side view of the baling assembly of FIG. 4 illustrating a first removable pad within the baling chamber.

Turning to FIG. 5, it is contemplated that the first pad 161 can be removable through the first access opening 154. For example, a bolt 164 can extend from the first pad 161 through an opening 166 in the lower surface 170 for securing the first pad 161 to the lower surface 170. Any number of bolts 164 and openings 166 can be utilized. Still further, laterally-extending tabs 168 can be provided on the first pad 161. In the illustrated example, the tabs 168 extend from one side of the first pad 161. Slots 172 (visible in FIGS. 4 and 6) can be provided in the housing 112 and configured to receive the corresponding tabs 168. In the illustrated example, the slots 172 can form an aperture in the housing 112 such that the tabs 168 extend to the exterior of the housing 112 (see FIG. 4). Additionally or alternatively, the slots 172 can be formed within the housing interior 113 such that the tabs 168 do not extend outside of the housing 112. In this manner, the first pad 161 can be inserted into an operating position within the baling chamber 120 and secured by the at least one bolt 164, opening 166, tabs 168, or slots 172.

Figure 6:
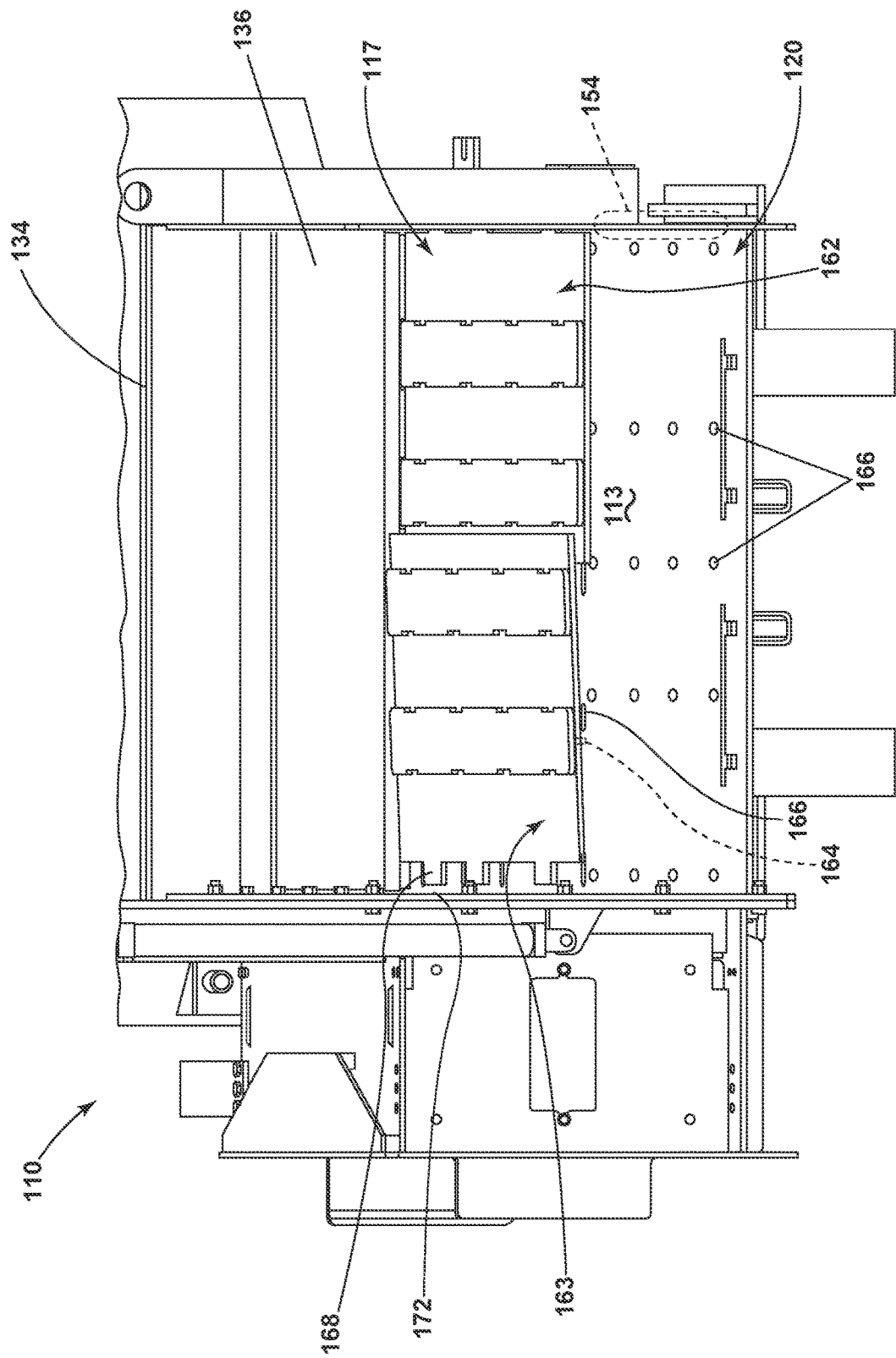
FIG. 6 is an elevated front view of the baling assembly of FIG. 3 illustrating additional removable pads.

FIG. 6 illustrates a front elevated view of the baling assembly 110 illustrating the baling chamber 120, gathering ram chamber 117, and gathering ram wall 136. In this view, the first access opening 154 is indicated on the right-hand side of the housing 112 as shown.

A second pad 162 and a third pad 163 can also be provided on the lower surface 170 of the housing 112. More specifically, the second pad 162 and third pad 163 are located beneath the hopper 134 within the gathering ram chamber 117. In this view, the gathering ram wall 136 is retracted along the first axis 151 away from the baling chamber 120. The first, second, and third pads 161, 162, 163 can be formed of any suitable material, including steel, aluminum, nylon, resin, fiberglass, rubber, a composite material, a compressible material, a rigid material, or the like, or any combination thereof. In addition, the first, second, and third pads 161, 162, 163 can be formed from identical or differing materials.

The second and third pads 162, 163 can also include bolts 164 extending through openings 166 in the lower surface. The openings can be round or elongated. The second and third pads 162, 163 can further include laterally-extending tabs 168 for securing to corresponding slots 172 in the housing 112. Any of the pads 161, 162, 163 can be secured by bolts 164 alone, tabs 168 alone, or a combination of bolts 164 and tabs 168.

It is contemplated that any or all of the first pad 161, second pad 162, or third pad 163 can be removed from the lower surface 170 and replaced as desired. In a non-limiting example, removal of the second pad 162 can be accomplished by removing bolts from the second pad 162 from below the housing 112, removing the tabs 168 of the second pad 162 from corresponding slots 172, and removing the second pad 162 via the first access opening 154. It is further contemplated that the first pad 161, second pad 162, or third pad 163, as well as suitable access openings, can be utilized anywhere within the baling assembly 110, including in the gathering ram chamber 119 or the ejection ram chamber 119. In one non-limiting example, a pad can extend through the baling chamber 120 and gathering ram chamber 119, and can be removed from the housing interior 13 by way of the first access opening 154. Any number of pads or access openings can be provided within the baling assembly 110.

During operation, the gathering ram wall 136 moves back and forth along the first axis 151 to compress material within the baling chamber 120. In a non-limiting example, the gathering ram wall 136 can contact or slide over any of the first pad 161, second pad 162, or third pad 163 during a compression operation, cleanly removing material from the bottom of the baling chamber 120 and forming a compressed bale therein. In another non-limiting example, the gathering ram wall 136 can be positioned vertically above the first pad 161, second pad 162, or third pad 163 by a predetermined distance during a compression operation, such as 3 mm in a non-limiting example. In such a case, the material within the baling chamber 120 can move or slide over the first pad 161, second pad 162, or third pad 163 during a compression or ejection operation. In this manner, any or all of the first pad 161, second pad 162, or third pad 163 can be easily removed or replaced based on frictional wear, adjustment, or service operations as needed.

Figure 7:
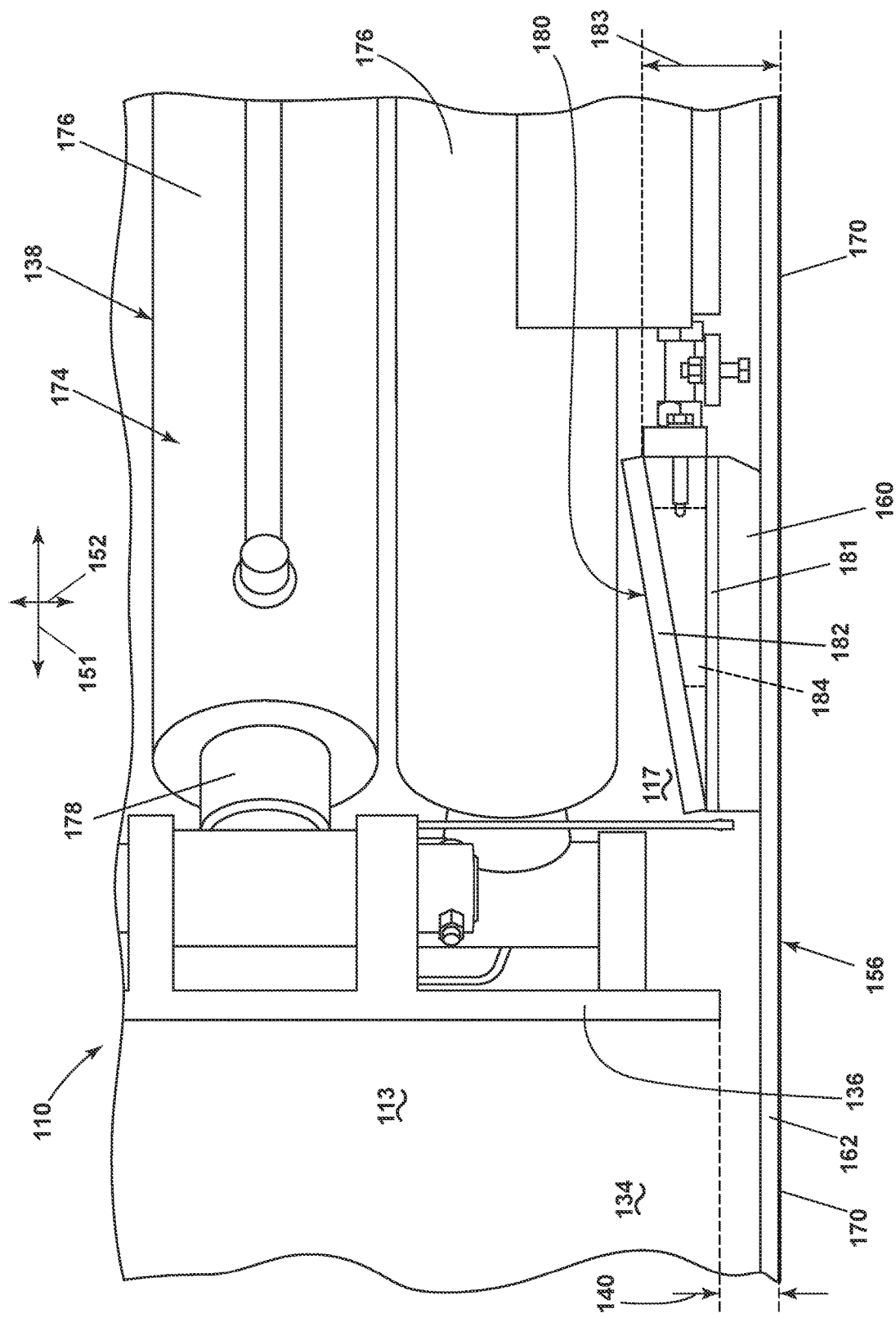
FIG. 7 is a right side view of the baling assembly of FIG. 3 including a ram in accordance with various aspects described herein.

Referring now to FIG. 7, a side view of the gathering ram chamber 117 is shown with a portion of the housing 112 removed. In this view, the hopper 134 is located to the left of the gathering ram wall 136. The second pad 162 is illustrated in position along the lower surface 170 of the housing 112 in the example shown. For reference, a position 140 of the ram 116 is illustrated between the gathering ram wall 136 and the lower surface 170 of the housing 112. In the example shown, the position 140 corresponds to a vertical position within the housing 112 though this need not be the case. It is contemplated that the position 140 can be defined between the gathering ram wall 136 and any surface within the gathering ram chamber 117. In addition, the gathering ram wall 136 and ram knife 175 (FIG. 3) can move as a collective unit within the housing 112. The position 140 between the gathering ram wall 136 and lower surface 170 also forms a corresponding spacing distance between the ram knife 175 (FIG. 3) and the upper surface 171 of the housing 112. For example, as the gathering ram wall 136 moves farther from the lower surface 170, the ram knife 175 moves closer to the upper surface 171.

The driving mechanism 138 is operably coupled to the gathering ram wall 136 for movement along the first axis 151. In the example shown, the driving mechanism 138 includes dual hydraulic cylinders 174. Each hydraulic cylinder 174 can include a barrel 176 surrounding a central piston 178 that can extend in and out of the barrel 176. The central piston 178 is extendable along the first axis 151 and coupled to the gathering ram wall 136. In this manner, movement of the central piston 178 can cause movement of the gathering ram wall 136 along the first axis 151.

A support structure 180 can also be located within the gathering ram chamber 117 beneath the driving mechanism 138. The support structure 180 is operably coupled to the driving mechanism 138. In the example shown, the support structure 180 is positioned beneath the barrel 176 of the lowermost hydraulic cylinder 174. It is contemplated that the support structure 180 can be operably coupled to a frame member or other portion of the gathering ram 116 within the gathering ram chamber 117. The support structure 180 can be coupled directly to the lower surface 170 of the housing 112 within the gathering ram chamber 117.

The support structure 180 in the illustrated example includes a first panel 181 and a second panel 182 spaced from the first panel 181. A moveable wedge 184 is positioned between the first panel 181 and second panel 182, and is schematically illustrated in dashed outline. In this manner the support structure 180 can form an adjustable support structure. In the example shown, the support structure 180 further includes a wear pad 160 provided between the first panel 181 and the lower surface 170 of the housing. The wear pad 160 can operably couple the first panel 181 to the lower surface 170. In one example, the wear pad 160 can rest unsecured on the lower surface 170, thereby carrying the support structure 180 while allowing for small movements along the lower surface 170 during operation of the baling assembly 110. In another non-limiting example, the wear pad 160 can be secured to the lower surface 170, such as via mechanical fasteners or chemical fasteners. In still another non-limiting example, additional panels or wear pads can be arranged over the lower surface 170, and the first panel 181 or wear pad 160 can be positioned over such additional panels.

A spacing distance 183 is defined between the lower surface 170 and second panel 182. The spacing distance 183 can be formed along a second axis 152. In the example shown, the second axis 152 is in a vertical direction and perpendicular to the first axis 151 though this need not be the case. For instance, the second axis 152 can form an acute angle between 0 degrees and 90 degrees with the first axis 151. In this manner, the second axis 152 can be unaligned with the first axis 151.

Figure 8:
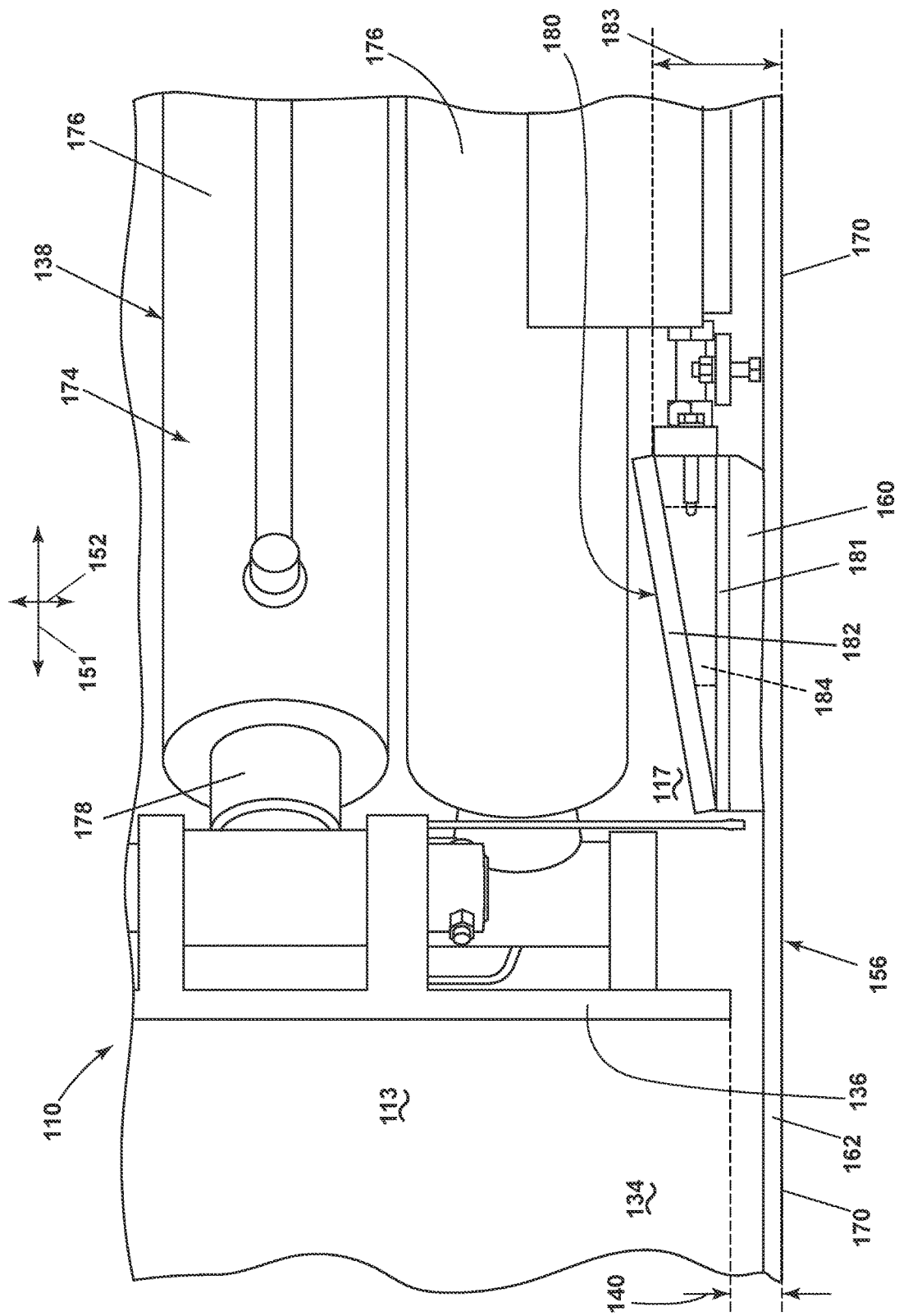
FIG. 8 is a right side view of the baling assembly and ram of FIG. 7 illustrating wear in a removable pad.

FIG. 8 illustrates the gathering ram chamber 117 of FIG. 7 with some exemplary wear of the wear pad 160. For example, after a number of cycles of operation of the gathering ram 116, the wear pad 160 can lose thickness and reduce the position 140, thereby closing a gap beneath the gathering ram wall 136, which can cause an undesired alignment of the gathering ram wall 136 or ram knife 175 (FIG. 3) within the gathering ram chamber 117. Such non-alignment can cause material within the hopper 134 to be skipped by the gathering ram wall 136 or ram knife 175, or to be caught beneath the gathering ram wall 136, in non-limiting examples.

Figure 9:
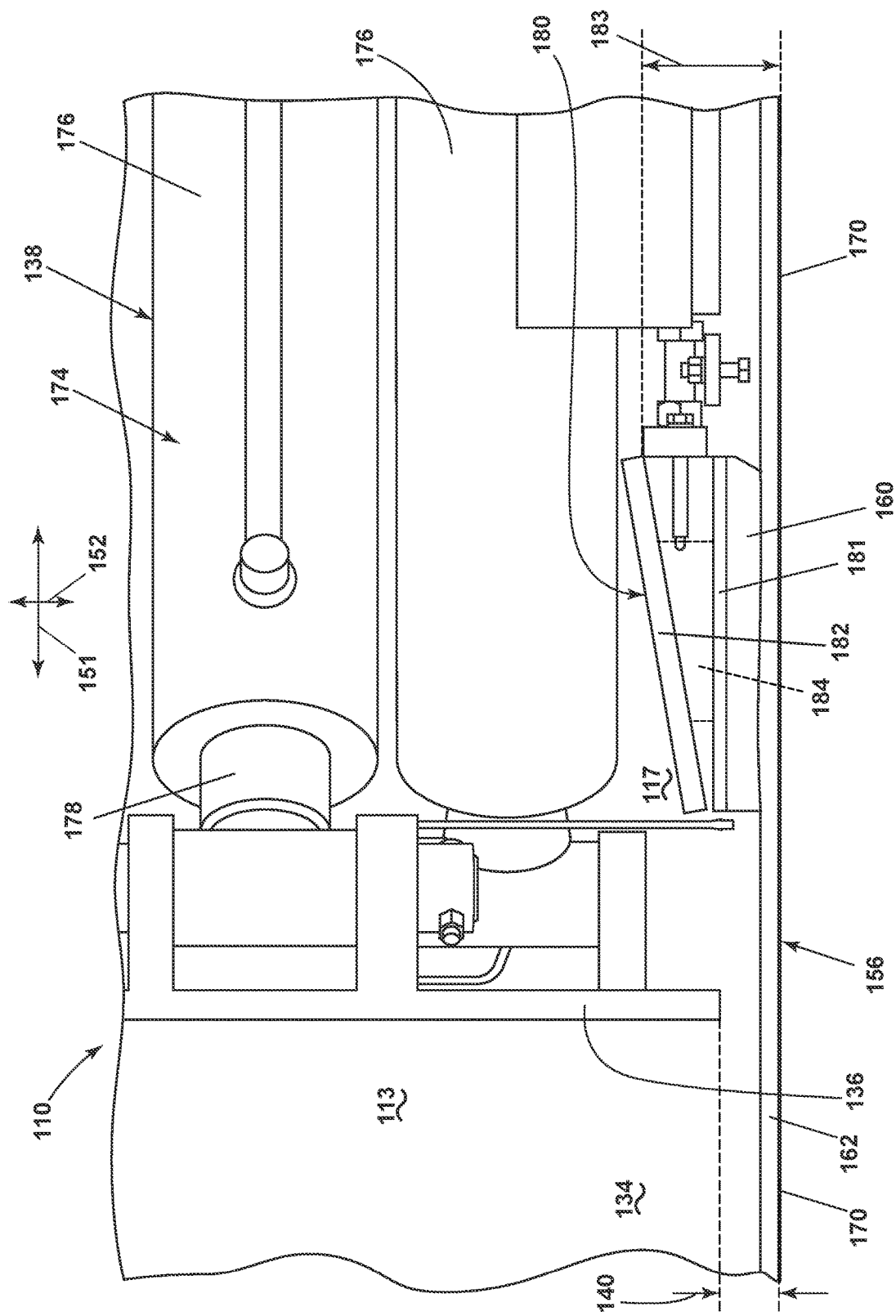
FIG. 9 is a right side view of the baling assembly and ram of FIG. 8 illustrating a position adjustment of the ram.

FIG. 9 illustrates the gathering ram chamber 117 of FIGS. 7 and 8 but where the wedge 184 of the support structure 180 is adjusted to a different position such that the spacing distance 183 is reduced. Such reduction of the spacing distance 183 can cause a change in the position 140 of the gathering ram 116 within the gathering ram chamber 117. In the example shown, reducing the spacing distance 183 of the support structure 180 causes a reduction in the position 140 of the gathering ram 116, thereby bringing the gathering ram wall 136 closer to the second pad 162.

While the example of FIGS. 7-9 illustrates a reduction in spacing distance 183, it will be understood that the spacing distance 183 can also be increased by motion of the wedge 184 within the support structure 180. Such an increase of the spacing distance 183 can also cause, in one non-limiting example, an increase in the position 140 of the gathering ram 116 with respect to the lower surface 170.

Figure 10:
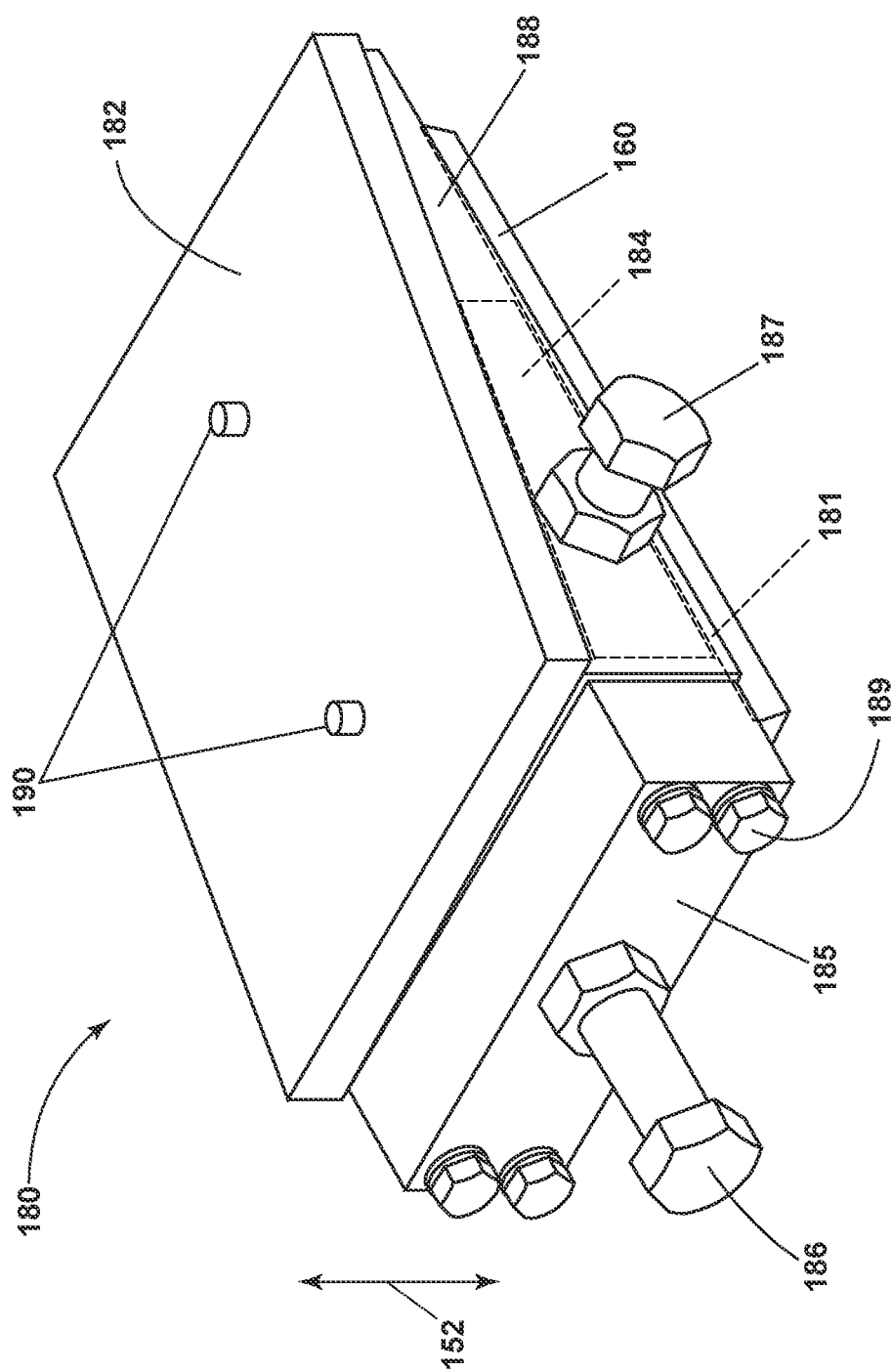
FIG. 10 is an isometric view of the support structure of FIG. 7.

Turning to FIG. 10, the support structure 180 is illustrated in further detail. The wedge 184 is located between the first and second panels 181, 182 as shown. A wedge cap 185 can be coupled to one end of the wedge 184, and a first fastener 186 can extend through the wedge cap 185 and into the wedge 184 as shown. The first fastener 186 can include a bolt, screw, rod, pin, turnbuckle, or the like, and can be threaded or non-threaded.

A second fastener 187 can extend into the wedge 184 perpendicularly to the first fastener 186 as shown. The second fastener 187 can also include a bolt, screw, lock screw, rod, pin, turnbuckle, or the like. The first and second fasteners 186, 187 can be identical or different.

Figure 11:
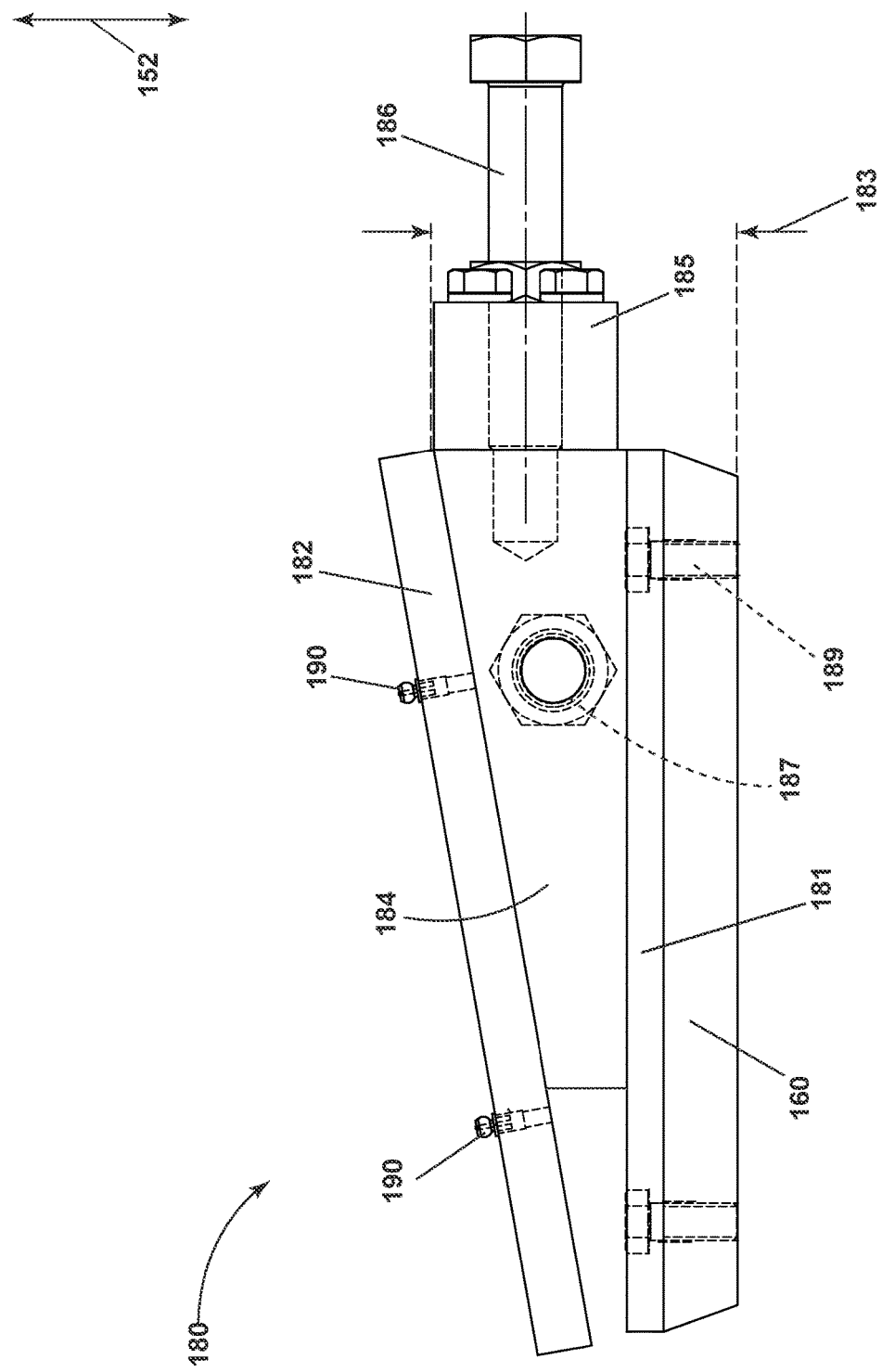
FIG. 11 is a side view of the support structure of FIG. 7 with a sidewall removed.

Two sidewalls 188 can be positioned between the first panel 181 and second panel 182, thereby enclosing the wedge 184 (visible in FIG. 11). The sidewalls 188 can be secured to the second panel 182, such as by welding or mechanical fasteners. The wedge cap 185 can include additional fasteners 189 securing the wedge cap 185 to the wedge 184. The first fastener 186 can extend fully through the wedge cap 185 and into the wedge 184. In addition, at least one fluid port 190 can be provided in the first panel 181 as shown. The at least one fluid port 190 can be utilized for the introduction of lubricant into the support structure 180, such as a grease zerk or fitting in a non-limiting example. Such lubricant can provide for smoothed movement of the wedge 184 between the first panel 181 and second panel 182.

FIG. 11 illustrates a side view of the support structure 180 coupled to the second pad 162 and with the sidewalls 188 removed for clarity. The first panel 181 is positioned between the second pad 162 and the wedge 184 of the support structure 180. Additional fasteners 189 extend through the first panel 181 and into the second pad 162, thereby securing the support structure 180 to the second pad 162.

The wedge 184 defines the spacing distance 183 of the support structure 180. In one example, adjustment of the first fastener 186, e.g. rotation, tightening, or the like, can cause the wedge 184 to move away from the wedge cap 185 between the first and second panels 181, 182, thereby causing the second panel 182 to move upward and causing the spacing distance 183 to increase. In another example, adjustment of the first fastener 186 can cause the wedge 184 to move toward the wedge cap 185 between the first and second panels 181, 182, thereby causing the spacing distance 183 to decrease. In this manner, adjustment of the first fastener 186 can modify or adjust the spacing distance 183 along the second axis 152, thereby forming a variable spacing distance 183.

With general reference to FIGS. 7-11, during operation of the driving mechanism 138, the piston 178 of each hydraulic cylinder 174 moves in and out of the barrel 176 and causes the gathering ram wall 136 to move back and forth along the first axis 151. The support structure 180 can be operably coupled to the driving mechanism 138 and form the position 140 of the driving mechanism 138 within the gathering ram chamber 117. In one example where adjustment is desired for the driving mechanism 138, e.g. a position adjustment of one hydraulic cylinder 174 along the second axis 152, the first fastener 186 can be adjusted such that the wedge 184 is moved to a new position between the first panel 181 and the second panel 182. The change in wedge 184 position causes a corresponding change in the spacing distance 183 along the second axis 152. The first panel 181 remains on the wear pad 160 while the second panel 182 and sidewalls 188 can move as a collective unit and are operably coupled to the gathering ram 116, e.g. by direct contact with the driving mechanism 138, such that the change in spacing distance 183 causes a corresponding modification of the position 140 of the driving mechanism 138 along the second axis 152.

It is contemplated that the support structure 180 can be utilized to modify a position of the gathering ram 116 in any desired direction. In one non-limiting example, the support structure 180 can be operably coupled to the gathering ram 116 to modify its position vertically, horizontally, or a combination thereof, while the driving mechanism 138 remains aligned with the first axis 151. The support structure 180 can also be operably coupled to the gathering ram 116 to modify an angular orientation of the gathering ram 116 within the gathering ram chamber 117. For example, while the driving mechanism 138 of FIGS. 7-9 is illustrated as being oriented along the first axis 151, the support structure 180 can also be utilized to tilt the driving mechanism along another axis unaligned with the first axis 151. In this manner, the support structure 180 can be utilized to align any portion of the gathering ram 116 along any direction within the gathering ram chamber 117, including in a translational or rotational direction.

Figure 12:
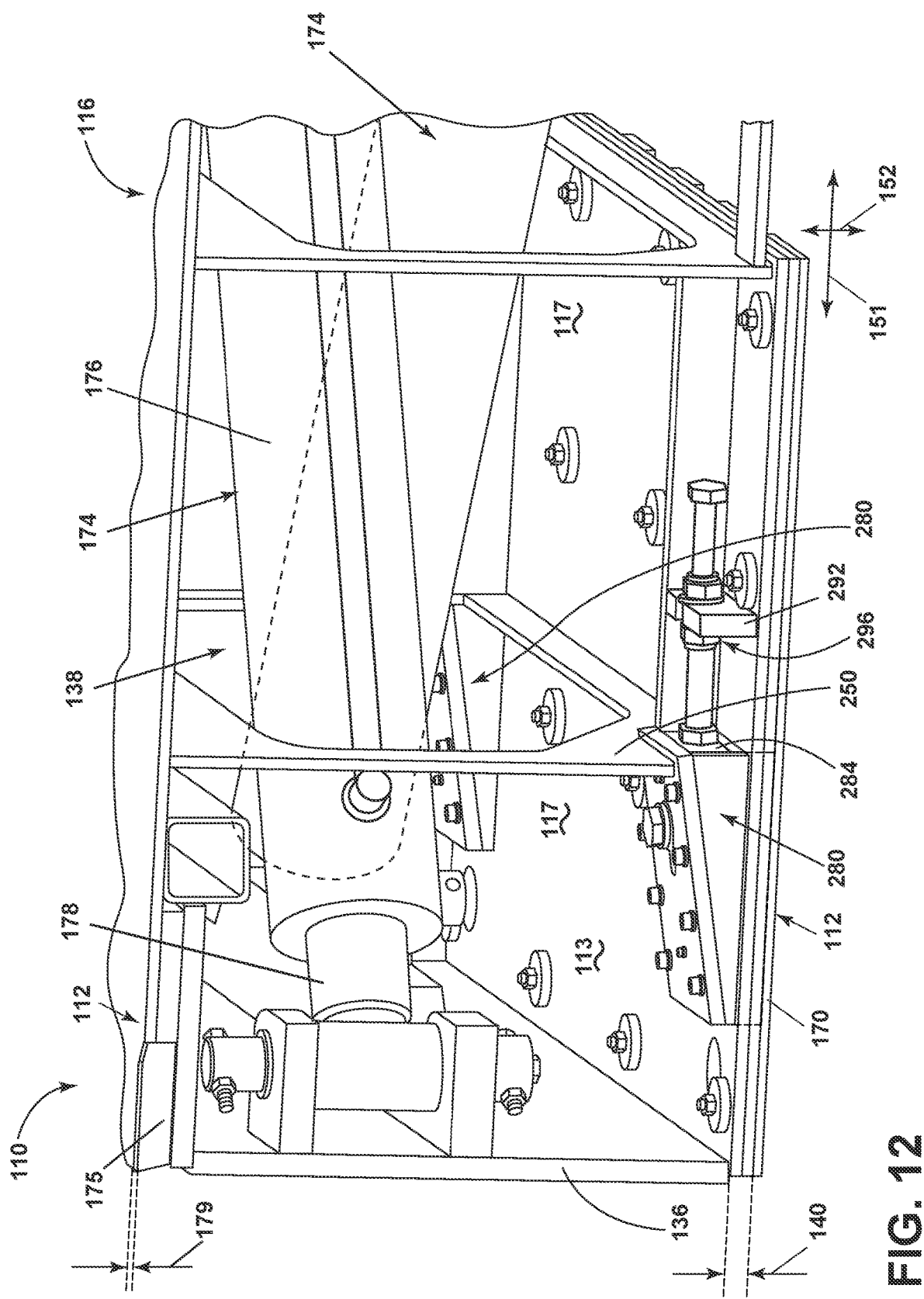
FIG. 12 is an isometric view of the baling assembly of FIG. 3 illustrating another support structure in accordance with various aspects described herein.

Referring now to FIG. 12, the baling assembly 110 is illustrated with another support structure 280 within the gathering ram chamber 117. The support structure 280 is similar to the support structure 180; therefore, like parts will be identified with like numerals increased by 100, with it being understood that the description of the like parts of the support structure 180 applies to the support structure 280, except where noted.

In the example shown, two support structures 280 are provided beneath each hydraulic cylinder 174 of the driving mechanism 138. Any number of support structures 280 can be provided. One difference compared to the support structure 180 is that one or both support structures 280 can be coupled to a frame member 250 within the gathering ram chamber 117. The frame member 250 is operably coupled to the driving mechanism 138 and can provide for positioning or alignment of the driving mechanism 138. It is contemplated that the frame member 250, driving mechanism 138, and gathering ram wall 136 can collectively move together as a single unit within the gathering ram chamber 117, though this need not be the case. In the example shown, the frame member 250, driving mechanism 138, and gathering ram wall 136 can collectively move along the second axis 152. A spacing distance 179 between the ram knife 175 and the upper surface 171 is illustrated. The corresponding position 140 of the gathering ram 116 is also illustrated. It is further contemplated that the frame member 250, driving mechanism 138, or gathering ram wall 136 can be individually movable, including due to adjustment of the support structure 280. Such movement can be along any direction, including translational or rotational movement within the baling assembly 110.

Each support structure 280 includes a wedge 284 and a first fastener 286 extending into the wedge 284 as shown. Another difference compared to the support structure 180 is that the support structure 280 includes a lock plate 292 and a paired fastener 296 receiving the first fastener 286. It is contemplated that the lock plate 292 and paired fastener 296 can be configured to fix a position, including a threaded position, of the first fastener 286 within the wedge 284.

Figure 13:
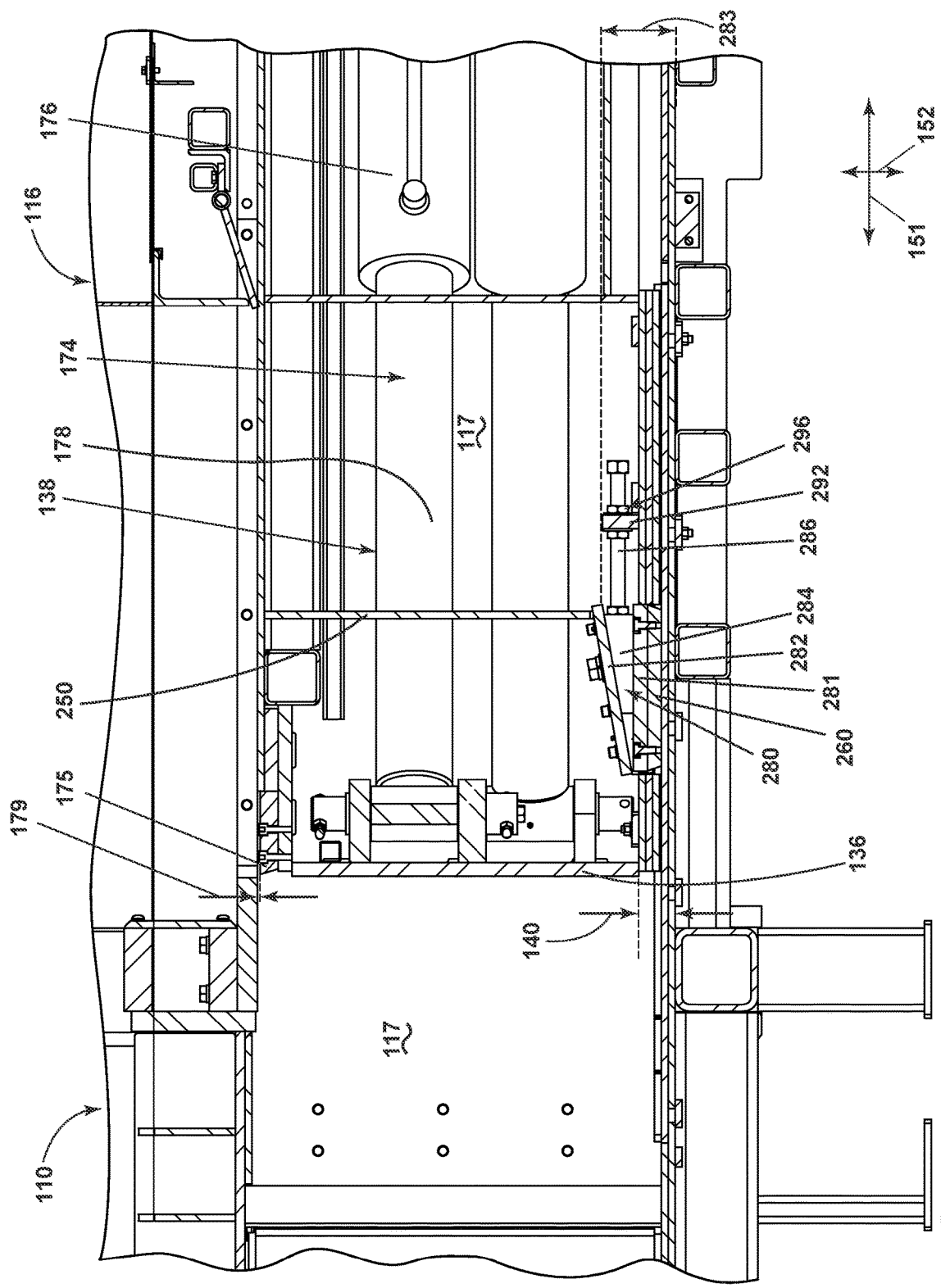
FIG. 13 is a side view of the baling assembly of FIG. 3.

Turning to FIG. 13, a side view of the gathering ram chamber 117 illustrates the support structure 280, spacing distance 283, position 140, and corresponding spacing distance 179 between the ram knife 175 and the upper surface 171. The support structure 280 includes a first panel 281, a second panel 282, and a wedge 284 between the first and second panels 281, 282. The first panel 281 can be in the form of a mount configured to secure to the lower surface 170 of the housing 112. It is further contemplated that the support structure 280 can include a wear pad 260 positioned between the first panel 281 and the lower surface 170 of the housing 112. The wear pad 260 can rest unsecured on the lower surface 170 in a non-limiting example.

Figure 14:
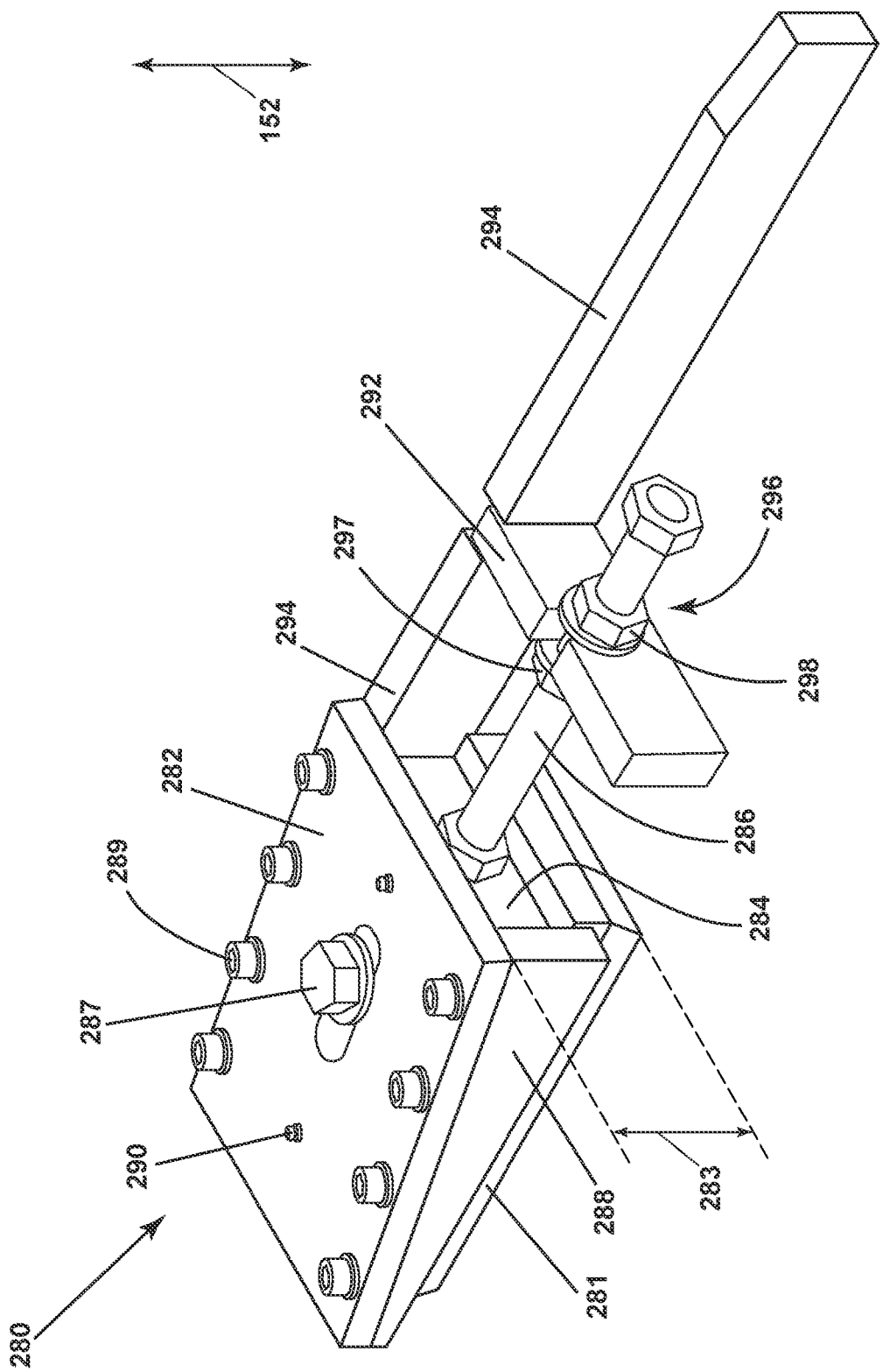
FIG. 14 is an isometric view of the support structure of FIG. 12.

FIG. 14 illustrates the support structure 280 in further detail. Two sidewalls 288 can be positioned between the first panel 281 and second panel 282, thereby at least partially enclosing the wedge 284. Another difference is that the second panel 282 can be removably coupled to the sidewalls 288. In the example shown, additional fasteners 289 are provided securing the second panel 282 to the sidewalls 288. The additional fasteners 289 can be bolts, screws, threaded or non-threaded rods, or the like, or combinations thereof. In this manner, the second panel 282 can be removed from the support structure 280 to provide access to the wedge 284, first panel 281, or other portions of the support structure 280 as desired. In addition, at least one fluid port 290 can be provided in the second panel 282 as shown, and can be utilized for the introduction of lubricant into the support structure 280.

Another difference compared to the support structure 180 is that the first fastener 286 couples directly to the wedge 284. A second fastener 287 can extend into the wedge 284 perpendicularly to the first fastener 286 as shown. The second fastener 287 can also include a bolt, screw, lock screw, rod, pin, turnbuckle, or the like. Still another difference is that the second fastener 287 extends into the wedge 284 through the second panel 282 as shown. It is contemplated that the second fastener 287 can move with the wedge 284. For example, the second fastener 287 can be loosened to provide for repositioning of the wedge 284, and then tightened when the wedge 284 is in a desired position. The first and second fasteners 286, 287 can be identical or different. The first fastener 286 can extend into the wedge 284 as shown for movement of the wedge 284 between the first panel 281 and second panel 282.

Still another difference is that the support structure 280 includes an elongated side frame 294 extending from one of the sidewalls 288. The side frame 294 can be coupled to the lock plate 292, for example by a groove or recess receiving an end of the lock plate 292. More specifically, a paired fastener 296 can be provided with the lock plate 292 for adjustment of the wedge 284 forward or backward within the support structure 280. The paired fastener 296 in the illustrated example includes a first nut 297 and a second nut 298 threaded onto the first fastener 286, with the lock plate 292 positioned between the nuts 297, 298. In one non-limiting example, turning the first nut 297 in a counter-clockwise direction can move the wedge 284 forward, thereby increasing the spacing distance 283, while turning the second nut 298 in a clockwise direction moves the wedge 284 backward, thereby decreasing the spacing distance 283. In this manner, turning of the first nut 297 or second nut 298 can cause a corresponding axial motion of the first fastener 286, thereby moving the wedge 284 between the first panel 281 and second panel 282. It is further contemplated that the side frame 294 can fix a position of the lock plate 292 to maintain a gap between the lock plate 292 and the wedge 284.

With general reference to FIGS. 12-14, during operation of the driving mechanism 138, the piston 178 of each hydraulic cylinder 174 moves in and out of the barrel 176 and causes the gathering ram wall 136 to move back and forth along the first axis 151. The support structure 280 can be operably coupled to the driving mechanism 138, such as via the frame member 250, and form a position of the driving mechanism 138 along the second axis 152. In one example where adjustment is desired for the driving mechanism 138, e.g. a position adjustment of one hydraulic cylinder 174 along the second axis 152, the first fastener 286 can be adjusted at the lock plate 292 such that the wedge 284 is moved to a new position between the first panel 281 and the second panel 282. The change in wedge 284 position causes the second panel 282, sidewalls 288, frame member 250, first fastener 286, lock bar 292, and side frame 294 to move as a collective unit to a new position, while the first panel 281 and wear pad 260 remain on the lower surface 170. Such motion causes a corresponding change in the spacing distance 283 along the second axis 152. The change in spacing distance 283 thereby forms or defines the position 140 of the driving mechanism 138 along the second axis 152 as well as the spacing distance 179 between the ram knife 175 and upper surface 171.

Aspects of the disclosure provide for a variety of benefits. The wear pads and access openings described herein provide for improved replacement or maintenance operations with minimal disassembly when accessing portions of the interior of the baling assembly. The modular construction of the wear pads can reduce waste in the event of uneven wear or uneven material contact during operation of the baling assembly. Furthermore, the support structures disclosed herein provide for a variable spacing distance for targeted adjustment, realignment, or maintenance of the driving mechanism within the baling assembly without need of disassembly or uninstalling the ram for adjustment. The ability to adjust a position of the ram driving mechanism through the access opening also increases process efficiencies by reducing time or labor needed for maintenance operations.

To the extent not already described, the different features and structures of the present disclosure can be used in combination with each other as desired. That one feature may not be illustrated in all the embodiments and is not meant to be construed that it cannot be, but is done for brevity of description. Thus, the various features of the different embodiments can be mixed and matched as desired to form new embodiments, whether or not the new embodiments are expressly described.

While aspects of the present disclosure have been specifically described in connection with certain specific embodiments thereof, it is to be understood that this is by way of illustration and not of limitation. Reasonable variation and modification are possible within the scope of the forgoing disclosure and drawings without departing from the spirit of the present disclosure which is defined in the appended claims.

What is claimed is:

1. A baling assembly, comprising:
   a housing defining an interior and having an access opening selectively covered by a closure;
   a baling chamber within the housing and having a wall movable along a first axis for compression of material within the baling chamber; and
   a ram in a ram chamber adjacent the baling chamber, the ram having the wall movable along the first axis for compression of material within the baling chamber and a driving mechanism operably coupled to the wall to urge movement of the wall along the first axis, the driving mechanism being movable along the first axis and along a second axis unaligned with the first axis; and
   an adjustable support structure located adjacent the closure and operably coupled to the ram for adjusting a position of the ram along the second axis.

2. The baling assembly of claim 1, wherein the ram further comprises a frame member coupled to the support structure and operably coupled to the driving mechanism.

3. The baling assembly of claim 1, wherein the support structure is operably coupled to the driving mechanism for adjusting the position of the ram.

4. The baling assembly of claim 1, wherein the support structure comprises a first panel, a second panel spaced from the first panel, and a wedge located between the first and second panels.

5. The baling assembly of claim 4, wherein the support structure further defines a spacing distance along the second axis.

6. The baling assembly of claim 4, wherein the support structure further comprises:
   a wedge cap coupled to an end of the wedge; and
   a first fastener extending through the wedge cap and into the wedge, wherein a location of the wedge between the first and second panels forms the position of the ram along the second axis.

7. The baling assembly of claim 6, wherein the support structure further comprises a second fastener extending into the wedge perpendicularly to the first fastener.

8. The baling assembly of claim 6, wherein the support structure further comprises at least one fluid port.

9. The baling assembly of claim 4, wherein the support structure further comprises a fastener threadably received by an end of the wedge, and a lock plate receiving the fastener and configured to fix a threaded position of the fastener within the wedge.

10. The baling assembly of claim 9, further comprising a side frame extending along the wedge and coupled to the lock plate.

11. The baling assembly of claim 4, wherein the first panel comprises a wear pad configured to secure to an interior surface of the housing.

12. The baling assembly of claim 1, further comprising at least one pad coupled to an interior surface of the housing.

13. The baling assembly of claim 12, wherein the support structure is positioned over the interior surface of the housing proximate to the at least one pad.

14. The baling assembly of claim 12, wherein the at least one pad is removable from the interior of the housing via the access opening.

15. The baling assembly of claim 1, wherein the housing further comprises an ejection ram coupled to the baling chamber along a third axis unaligned with the first axis and the second axis for removal of compressed material from the baling chamber.

16. A support structure for a baling assembly having a ram with a driving mechanism, the support structure comprising:
   a first panel configured to be operably coupled with a housing of the baling assembly;

a second panel configured to operably couple to the driving mechanism;

a wedge located between the first panel and the second panel; and at least one fastener threadably received by the wedge and defining a variable spacing distance between the first and second panels.

17. The support structure of claim 16, further comprising a wedge cap coupled to an end of the wedge, wherein the at least one fastener extends through the wedge cap and into the wedge.

18. The support structure of claim 16, further comprising at least one fluid port in at least one of the first panel or the second panel.

19. The support structure of claim 16, further comprising a lock plate receiving the at least one fastener and configured to fix a threaded position of the at least one fastener.

20. The support structure of claim 19, further comprising a side frame extending along the wedge and coupled to the lock plate.

* * * * *